Jan. 27, 1953 P. J. HOWARD 2,627,017
PREWARMING DEVICE FOR FILM SLIDES
Filed Oct. 11, 1951
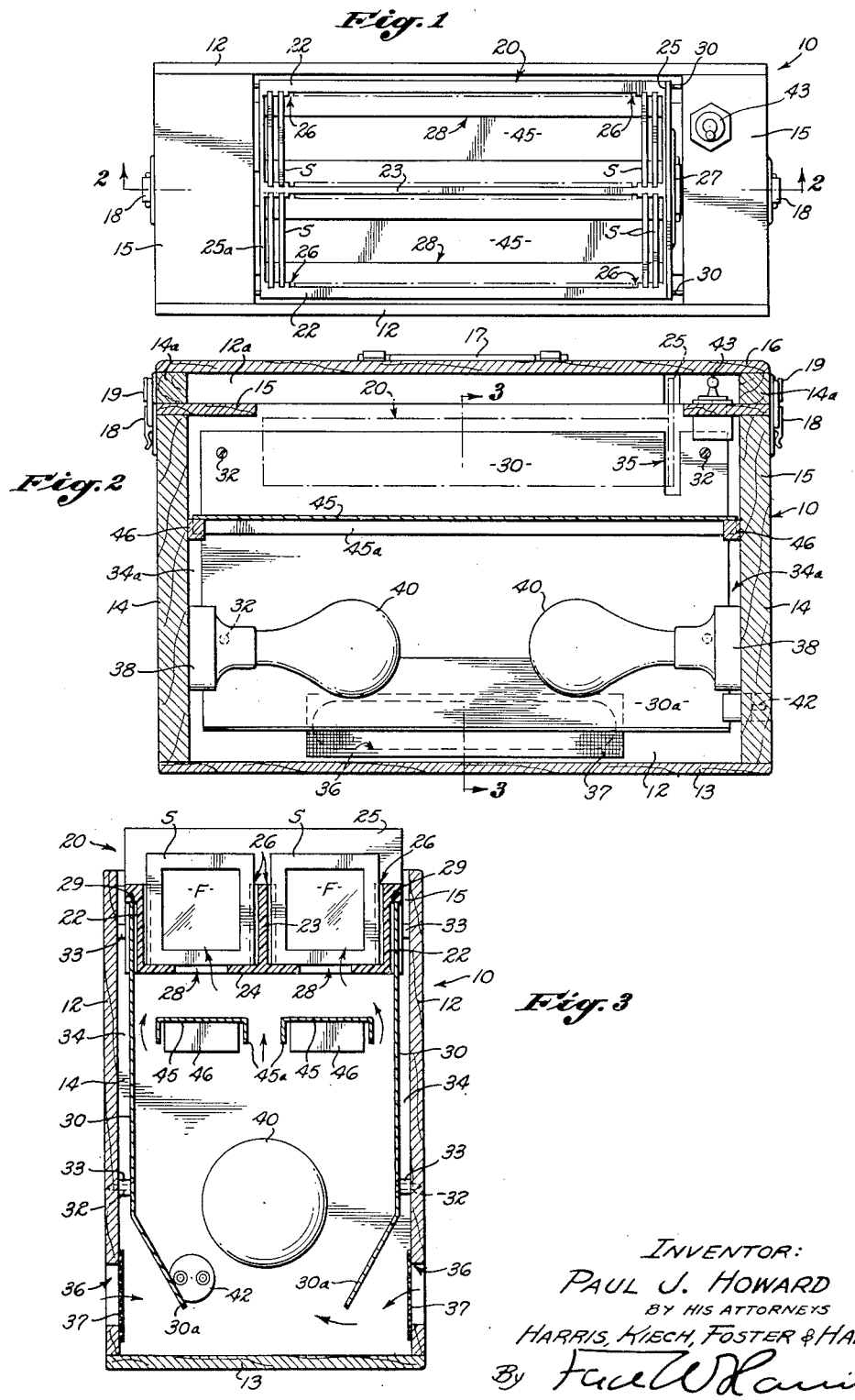
INVENTOR:
PAUL J. HOWARD
BY HIS ATTORNEYS
HARRIS, KIECH, FOSTER & HARRIS Patented Jan. 27, 1953

2,627,017

UNITED STATES PATENT OFFICE 2,627,017

PREWARMING DEVICE FOR FILM SLIDES

Paul J. Howard, Bakersfield, Calif.

Application October 11, 1951, Serial No. 250,836

19 Claims. (Cl. 219—45)

This invention relates to means for the preheating of film slides prior to their being introduced into projecting apparatus.

It is common to mount developed photographic film, both black and white film and color film, between two cardboard sheets cemented together, thereby producing slides adapted to be introduced into projecting machines. Since the exposed portions of these slides which are to be projected are not mounted between glass pieces or otherwise backed up, they bulge or warp more or less readily when exposed to the heat of the lamp with which the projector being used is equipped. This bulging or warping always occurs in the same direction, that is, away from the emulsion side of the film. Since this heating, warping, or bulging is not immediate, if the image is focused on a projection screen when the slide is first introduced into the projector, refocusing is required after the film has become heated and correspondingly deformed.

I have discovered that refocusing, as above indicated, may be avoided by employing some means for preheating the film so that the warping, bulging, or other deformation will have taken place before the slide is introduced into the projector.

It is therefore an object of this invention to provide simple means for preheating film slides of the described character to a temperature approximating that to which they will be heated in projectors, whereby to produce in the film prior to projection that same deformation which it will suffer in the projector if introduced when cold.

Another object of this invention is to provide a device in the form of a relatively simple kit which will serve both as a carrier for an appreciable number of film slides as well as a preheating device therefor.

Still another object of the invention is to provide a simple, portable structure for preheating film slides of the stated character, which structure is provided with simple means for plugging into the conventional electric current employed in operating the projector.

It is also an object of the invention to provide a preheating device of the indicated type which will insure efficient travel of heated air to the slides to be heated, which will prevent escape of light from the heating means being employed, and which possesses appropriately guarded air inlet means and directing means for air passing into the bottom of the structure and to the heating means.

Still another object of the invention is to provide a preheating device for film slides in which the slides are so positioned as to be readily accessible for individual removal and replacement by the projector operator, if desired.

Other objects of the invention, together with the various features of construction thereof, will become apparent upon reference to the following specification and accompanying drawing wherein one embodiment of the invention is illustrated.

In the drawing:

Fig. 1 is a top plan view of an apparatus according to this invention with film slides in operative position and ready for removal and projection;

Fig. 2 is a vertical longitudinal section taken on the line 2—2 of Fig. 1, this figure also showing in place a movable cover closing the apparatus, for retaining a tray full of slides against displacement, and for transporting the apparatus when not in use; and Fig. 3 is a vertical cross section taken on the line 3—3 of Fig. 2.

The structure illustrated includes a housing 10 which comprises vertical side walls 12, a bottom wall 13, vertical end walls 14, and short, inwardly directed, horizontal closure walls 15 which are secured to the upper ends of the end walls 14 and fit between the adjacent upper edge portions of the side walls 12.

As shown in Fig. 2, a removable cover 16 may be employed for the purpose of closing and transporting the device when not in use. The top wall of this cover is conveniently provided with a handle 17, the cover having side walls 12a and end walls 14a corresponding with the side and end walls 12 and 14 of the housing 10 and adapted to be placed in aligned position directly thereabove. Clamps 18 on the end walls 14, which may be of the bail type, may be used in conjunction with retainers 19 carried on the end wall portions 14a of the cover.

Within the top opening of the housing 10 between the inner ends of the closure walls 15 and the upper portions of the side walls 12, there is mounted in practice a slide-holding tray 20 for cardboard slides S in which are conventionally mounted developed photographic film F. These slides S are representative of the familiar square slides containing either square film or the very popular 35 mm. film whether in color or in black and white. The tray 20 is indicated as being of approximately conventional size adapted to carry two rows of slides S, totalling for example two hundred slides. This tray is provided with side walls 22, a longitudinally extending partition 23, a bottom wall 24, a relatively high front end wall 25 which extends somewhat above the tops of the slides S, and a relatively low rear end wall 25a of about the same height as the side walls 22. Conventionally the side walls 22 and the partition 23 have vertical grooves 26 (Figs. 1 and 3) to receive one or two slides S and the front end wall 25 is commonly provided with an appropriate drawer handle 27. This form of drawer or tray 20 differs from the conventional in that, inter alia, its bottom wall 24 is provided with a longitudinally extending slot 28 beneath each row of slides S, for the upward passage of warm air therethrough and between the slides S. Also, the side walls 22 are provided adjacent their upper edges with outwardly directed longitudinally extending overhanging supporting shoulders 29 which, when in operative position, rest upon the upper edges of vertically disposed baffle walls 30.

In a preferred form the vertical baffle walls 30 are of metal, such as aluminum, whereas the walls of the housing 10 may be of plywood. The walls 30 are mounted upon and parallel to the side walls 12 of the housing 10, such mounting being effected for example, by a plurality of screws 32 and short spacers 33 thereon (Fig. 3) which position the supporting walls 30 a short distance from the side walls 12 of the housing and provide shallow vertical spaces 34 (Fig. 3) therebetween. The ends of the supporting walls 30 may terminate very close to the end walls 13 or be spaced a distance therefrom as indicated at 34a in Fig. 2. The upper edge of each supporting wall 30 adjacent its end where the front end wall 25 of the tray 20 is located is slotted at 35 to receive the corresponding side portion of such end wall 25 when the latter is lowered into position. This slotting is necessary because the sides of the wall 25 are flush with the outermost edges of the shouldered portions 29 of the side walls 22, which is typical of the outer end panel of many drawer-like structures of which the tray 20 is representative.

For the purpose of providing for necessary air travel, the bottom portions of the side walls 12 are provided with elongated horizontal air inlet openings 36 (Figs. 2 and 3) which are desirably guarded by screens 37 attached to their interior edges. The lower ends of the supporting walls 30 are inwardly bent as seen in Fig. 3 to provide lower baffle portions 30a whose lower ends are directed toward each other and provide between them a restricted throat through which air from the openings 36 moves inward and upward for passage through the chamber between the walls 30 and upward through the previously mentioned slots 28 as indicated by the long arrows.

For the purpose of providing adequate heat, the lower portions of the inner faces of the end walls 14 are provided with inwardly faced electrical sockets 38, or other appropriate mountings, for suitable heat-supplying means such as incandescent electric lamps 40. These heating means lie just above the throat between the lower edges of the lower baffle plate portions 30a of the supporting walls 30, the portions 30a acting to obstruct light rays which would otherwise pass from the lamps 40 through the air intake openings 36 and possibly interfere with projection. In practice, where trays of 2" x 2" slides are employed with apparatus proportioned as illustrated, two 75 watt lamps have been thoroughly satisfactory, but these may be varied as deemed necessary. The electrical current required for the lamps 40 is to be supplied by way of an extension cord leading to an appropriate plug 42 which may be mounted in one end wall 14, suitable lines leading to the lamps 40 via their sockets 38. For convenience in switching off the lamps 40, a switch 43 is mounted upon one of the closure walls 15, appropriate leads extending to this switch.

Cooperating with the lower baffle portions 30a of the supporting walls 30 to distribute properly the rising warm air, and to block off light rays which might otherwise pass upward through the air slots 28 in the bottom of the tray 20, are two spaced, elongated baffles 45 provided with depending flanges 45a, the resultant channels being faced downward. These baffles are supported at their ends on blocks 46 or other suitable supports secured to the inner faces of the end walls 14, the flanges 45a preventing substantial lateral shift. With this arrangement, cool air entering the air inlet openings 36 at the bottom of the device and passing upward through the throat between the lower ends of the baffle portions 30a travels upward in the vicinity of the lamps 40 toward the elongated baffles 45 with their downwardly directed channels. These baffles 45 serve both to retard the upward air flow and to distribute and diffuse the heated air which is divided into three rising streams that in turn mix above the baffles 45 to form two rising streams of heated air which pass upward through the slots 28 and between the vertically positioned film slides S. By these means, lamps 40 of appropriate wattage having been used, the films F and slides S are heated to approximately the temperature to which they would be heated in the projector being used, so that such deformation of the films as would have been produced in the projector will already have been effected at the time that the slides are placed in the projector. The films thus are ready for use after a short lapse of time. Additionally, as above indicated, the baffles 45 prevent the escape of annoying direct light rays upward between the slides S.

It will be apparent from the foregoing that the lateral supporting walls 30, with their angularly disposed lower baffle portions 30a (which may be positioned at angles between about 30° and about 45°), not only serve to support the tray 20 by engagement of their upper edges with the side shoulders 29 thereof, but also to act as baffle means in conjunction with the baffles 45 and the slotted bottom wall 24 of the tray 20 to insure proper air dispersion and proper heating of the air by the lamps 40. It will also be noted that the tops of the film slides S are disposed not only above the side walls 22 of the tray 20 but also somewhat above the tops of the side walls 12 of the housing 10. Thus, the upper portions of the film slides S are always in position of ready accessibility for the operator of the projection machine. If projection is to be interrupted for a substantial time, the lamps 40 may be readily extinguished by actuating the switch 43. When the apparatus is not in use, the cover 16 is placed as shown in Fig. 2 and retained by the clamps 18. This renders it feasible to leave the tray 20 filled with slodes S in operative position in the apparatus, and the top wall of the cover 16 will prevent dislodgment of the slides S should the device be turned over on its side or upside down.

It is apparent that variations of the generic invention illustrated will, of course, occur to those skilled in the art, and it is therefore intended to cover all such modifications as fall within the scope of the patent claims.

I claim as my invention:

1. In combination in a prewarming device for film slides: a housing having vertical end and side walls, and a bottom wall; spaced supporting and air-guiding baffle walls extending alongside certain of said vertical walls and spaced somewhat therefrom, such supporting walls having their lower edges spaced above said bottom wall and providing between them a warm air chamber; heating means disposed between the lower end portions of said supporting walls; means for supplying air into the lower end of said chamber; and a slide tray supported upon the upper portions of said supporting walls, said tray having means for positioning slides in spaced relation and having slot means in its bottom underlying said slides when in position, said slot means providing for the passage of warm air upward between said slides from said warm air chamber.

2. A combination as in claim 1 wherein said tray has side walls which have shoulders adjacent their upper edges, said shoulders resting upon said upper edges of said supporting walls with the lower portions of such side walls of said tray lying between said supporting walls.

3. A combination as in claim 2 wherein the top portion of said chamber is closed except for said slot means.

4. A combination as in claim 3 including baffle means spaced below said slot means and spaced from said supporting walls to deflect laterally warm air currents rising in said chamber.

5. A combination as in claim 1 including baffle means spaced below said slot means and spaced from said supporting walls to deflect laterally warm air currents rising in said chamber.

6. A combination as in claim 1 wherein the lower portions of said supporting walls are directed inward toward each other to produce a restricted air inlet throat at the bottom of said chamber and below said heating means.

7. A combination as in claim 6 wherein air inlet means are provided in the side walls of said housing adjacent said inwardly directed lower portions to supply air to said throat.

8. A combination as in claim 7 wherein said heating means are electric lamps disposed above said throat.

9. A combination as in claim 1 wherein said tray has upstanding slide-positioning side walls terminating approximately even with the tops of the side walls of said housing to place slides therein in readily accessible position.

10. In combination in a prewarmer for film slides: a housing having end and side walls; supporting means provided on upper portions of said side walls; a slide-carrying tray carried on said supporting means, said tray having a bottom wall disposed between said side walls, and said bottom wall being slotted for passage of air therethrough to slides in the tray, said housing being substantially closed at its top except for said slotting heating means disposed in the lower portion of said housing below said slotted wall; and means providing for entrance of air to the bottom of said housing below said heating means.

11. A combination as in claim 10 including baffle means underlying the slotted portions of said bottom wall to deflect air currents rising about said heating means and distribute them evenly to said slotted portions.

12. A combination as in claim 11 wherein said heating means is in the form of lamp means and said baffle means is positioned to block off direct light rays therefrom to said slotted portions.

13. A combination as in claim 12 wherein said air entrance means includes an opening, and baffle means is disposed between said lamp means and said opening to prevent escape of direct light rays therethrough.

14. A combination as in claim 10 wherein said air entrance means includes an opening and said heating means is light-emitting means, baffle means being disposed between said opening and said light-emitting means to block off passage of direct light through said opening.

15. A combination as in claim 10 wherein said tray is located adjacent the top of said housing to position said slides in easily accessible position, and a cover fitting the top of said housing and closely overlying said tray and slides to prevent substantial displacement of said tray and slides.

16. In combination in a prewarmer for film slides: a housing having side and end walls enclosing a warm air chamber in the lower portion thereof; supporting means provided by upper portions of certain of said walls to support a slotted slide-carrying tray, and said walls providing means at the upper portions to close the upper portion of said air chamber about said tray, said supporting means being in the form of wall members attached to certain of said housing walls and spaced therefrom with their upper portions positioned for engagement with said tray; means for supplying air to the bottom of said chamber; and heating means in the lower portion of said chamber and in the path of entering air to heat such air.

17. A combination as in claim 16 including baffle means below the position of said tray to distribute heated air passing to said tray.

18. A combination as in claim 17 wherein said heating means is lamp means, said baffle means being positioned to block off direct light rays, and said air-supplying means includes an opening through certain of said walls, baffle means being provided between said opening and lamp means to block off passage of light rays through said opening.

19. A combination as in claim 16 wherein said heating means is lamp means and said air-supplying means includes an opening through certain of said walls, baffle means being provided between said opening and lamp means to block off passage of direct light rays through said opening.

PAUL J. HOWARD.

REFERENCES CITED

The following references are of record in the file of this patent:

UNITED STATES PATENTS

| Number | Name | Date |
|---|---|---|
| Re. 17,637 | Brown | Apr. 8, 1930 |
| 1,512,482 | Patterson | Oct. 21, 1924 |
| 1,547,160 | Bailey | July 28, 1925 |
| 1,694,175 | Hauser | Dec. 4, 1928 |
| 1,712,204 | Gibney | May 7, 1929 |
| 1,827,788 | Hicks | Oct. 30, 1931 |
| 1,992,684 | Weinberger | Feb. 26, 1935 |
| 2,520,830 | Borzner | Aug. 29, 1950 |

FOREIGN PATENTS

| Number | Country | Date |
|---|---|---|
| 6,374 | Great Britain | Mar. 14, 1911 |
| 615,748 | France | Oct. 18, 1926 |